(12) United States Patent
Chuang et al.

(10) Patent No.: US 8,381,580 B2
(45) Date of Patent: Feb. 26, 2013

(54) TIRE PRESSURE MONITORING DEVICE WITH INCLINABLE VALVE STEM

(75) Inventors: Kuo-Chih Chuang, Taichung (TW); Hsin-Chieh Chen, Taichung (TW)

(73) Assignee: Oro-Tek Co., Ltd., Taichung (TW)

( * ) Notice: Subject to any disclaimer, the term of this patent is extended or adjusted under 35 U.S.C. 154(b) by 133 days.

(21) Appl. No.: 13/150,926

(22) Filed: Jun. 1, 2011

(65) Prior Publication Data

US 2012/0304755 A1    Dec. 6, 2012

(51) Int. Cl.
*B60C 23/02* (2006.01)
(52) U.S. Cl. ..................................... 73/146.8
(58) Field of Classification Search .......... 73/146–146.8
See application file for complete search history.

(56) References Cited

U.S. PATENT DOCUMENTS 5,027,848 A * 7/1991 Leeuwen ...................... 137/227
6,952,955 B1 * 10/2005 Uleski ............................. 73/146
2007/0295076 A1 * 12/2007 Blossfeld et al. ............ 73/146.8
2010/0064792 A1 * 3/2010 Chuang et al. ............... 73/146.8
2011/0272038 A1 * 11/2011 Falkenborg ................... 137/224

* cited by examiner

*Primary Examiner* — Andre Allen
(74) *Attorney, Agent, or Firm* — Muncy, Geissler, Olds & Lowe, PLLC

(57) ABSTRACT

A tire pressure monitoring device with an inclinable valve stem is disclosed. The tire pressure monitoring device includes: a main body having a channel, wherein the channel includes a socket segment near one end thereof; the valve stem being movably fixed to a wheel rim and having a domed end movably received in the socket segment wherein the domed end has a threaded hole axially passing therethrough; and a positioning bolt being positioned in the channel from an opposite end of the channel and coupled with the threaded hole, so that the domed end of the valve stem is movably positioned in the socket segment and when the domed end moves, an angle between the connected valve stem and the main body is changed, thereby allowing the main body to abut against the wheel rim.

9 Claims, 7 Drawing Sheets

FIG. 1(PRIOR. ART)

TIRE PRESSURE MONITORING DEVICE WITH INCLINABLE VALVE STEM

BACKGROUND OF THE INVENTION

1. Technical Field

The present invention relates to tire pressure monitoring devices, and more particularly to a tire pressure monitoring device featuring for a valve stem that is inclinable with respect to a main body of the tire pressure monitoring.

2. Description of Related Art

Automobiles are undoubtedly the most important transportation means for the modern times. Therefore, the contemporaries put increasing attention to car safety. Among others, appropriate tire pressure is essential for safe and smooth driving. As compared with properly filled tires, low-pressure tires can consume more fuel during driving and make it more difficult for a driver to control the direction where a car proceeds, wherein the latter in particular endangers the driver and his/her passengers in car.

Recently, there have been many tire pressure monitoring devices on the market. For example, FIG. 1 is a conventional tire pressure monitoring device, which comprises a main body 1 and a valve stem 2 fixedly attached to the main body 1. The valve stem 2 is configured to be set in a valve-stem hole formed on a tire wheel rim 9 and work with a bolt 3 as well as a nut 4 to affix the main body 1 to the tire wheel rim 9, so that the main body 1 is allowed to monitor the tire pressure during driving all the time and warn the driver with a signal when the tire pressure is detected as abnormal.

It is noted that on various wheel rim products such valve-stem holes are locate differently. For easily adapting the valve stem 2 to different installation angles for most valve-stem holes, the washer and nut used to hold the valve stem 2 of the conventional tire pressure monitoring device about a valve-stem hole of a wheel rim 9 are typically round-headed, which allow the valve stem 2 to be inclined as needed. However, since the valve stem 2 comes integratedly with the main body 1, when the valve stem 2 inclines for adaptation, the main body 1 is likely to be lifted from the wheel rim 9 where it should rest on and become suspending about the wheel rim 9. Such a suspending main body 1 can be rocked under the centrifugal force generated by the rolling wheel, and this is harmful to the tire pressure monitoring device itself. Hence, in the course of attaching the tire pressure monitoring device to the wheel rim 9, it is important to ensure that the relative location among the main body 1, the valve stem 2 and the nut 4 is proper set. To this end, manual adjustment has to be carefully performed throughout the course of attachment, making the attachment inconvenience.

SUMMARY OF THE INVENTION

In view of the aforementioned inconvenience, the present invention provides a tire pressure monitoring device with an inclinable valve stem, wherein the valve stem can be moveably inclined with respect to a main body of the tire pressure monitoring device, so as to ensure the main body abutting against a wheel rim where the tire pressure monitoring device is attached to, thereby preventing the tire pressure monitoring device from being impacted and in turn damaged under the centrifugal force generated by the rolling wheel rim.

According to the present invention, the tire pressure monitoring device primarily comprises:

a main body having a channel axially passing therethrough, wherein the channel includes a socket segment near one end thereof;

the valve stem being configured to be set in a valve-stem hole formed on a wheel rim, wherein a washer is sleeved around the valve stem and a nut is screwed around the valve stem, so as to fix the valve stem in the valve-stem hole, the valve stem having a domed end movably received in the socket segment, and the domed end being formed with a threaded hole axially passing therethrough; and a positioning bolt being positioned in the channel from an end of the channel opposite to the socket segment and coupled with the threaded hole, so that the domed end of the valve stem is movably positioned in the socket segment and when the domed end moves, an angle between the connected valve stem and the main body is changed, thereby allowing the main body to abut against the wheel rim.

One objective of the present invention is to allow adjustment of the angle between the valve stem and the main body for catering for various configurations of wheel rims, thereby ensuring the main body abutting against the wheel rim and preventing the tire pressure monitoring device from getting impacted and damaged when the wheel rim is rolling. The disclosed pressure monitoring device is thereby adaptive to various wheel rims.

Another objective of the present invention is to ensure the main body abutting against the wheel rim by providing the valve stem with a retaining ring that retains and positions the washer. Further, the retaining ring may be screwed to the valve stem so as to facilitate adjustment of the valve stem with respect to the wheel rim.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

While the present invention is described in light of its spirit with particular embodiments, the accompanying drawings depicting the embodiments are made for clear illustration and are might not be made to scale.

Figure 1:
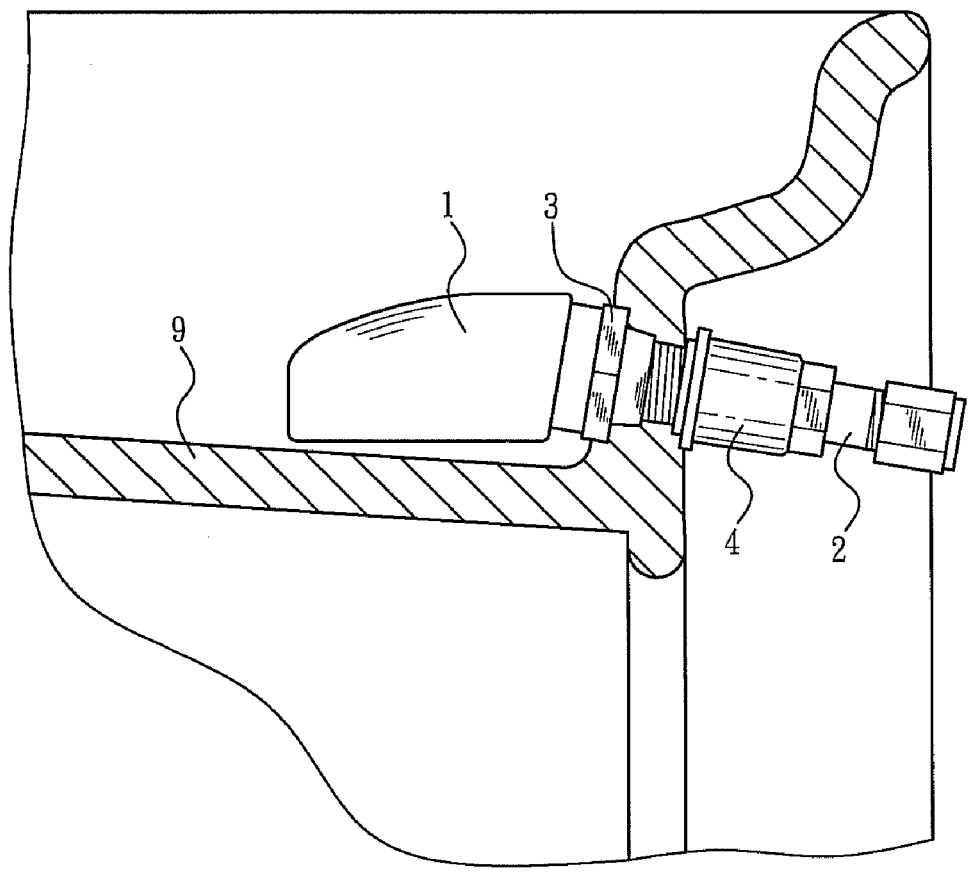
FIG. 1 is a schematic drawing illustrating an installed conventional tire pressure monitoring device.
Figure 2:
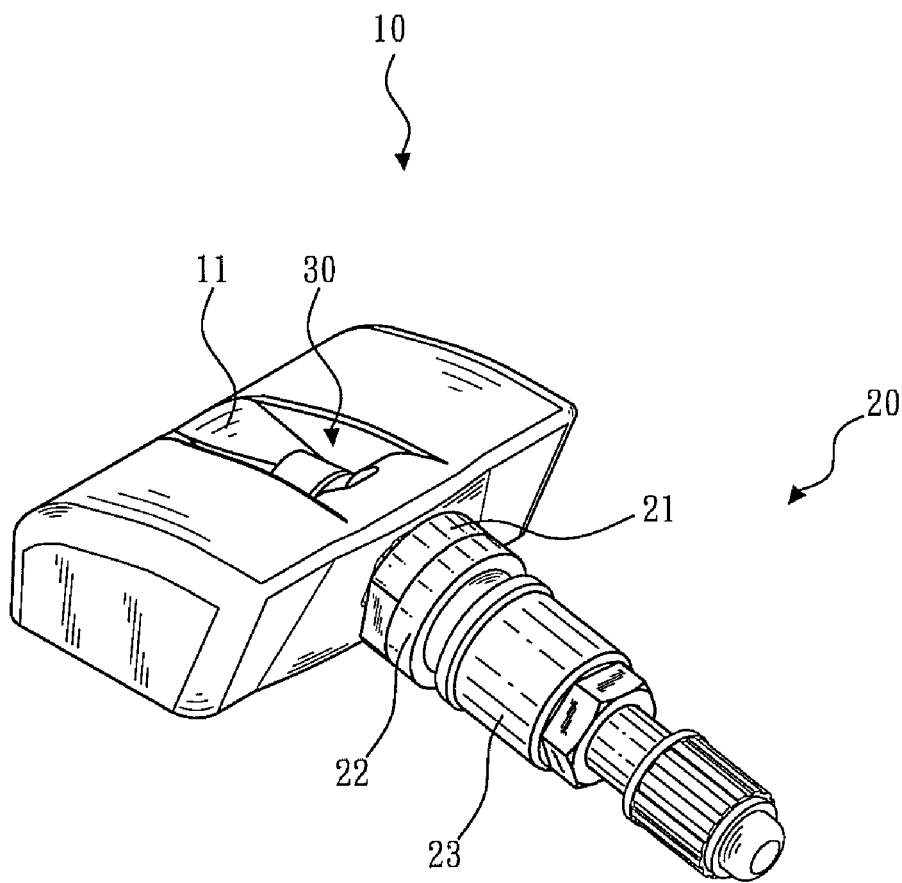
FIG. 2 is a perspective view of a tire pressure monitoring device of the present invention.
Figure 3:
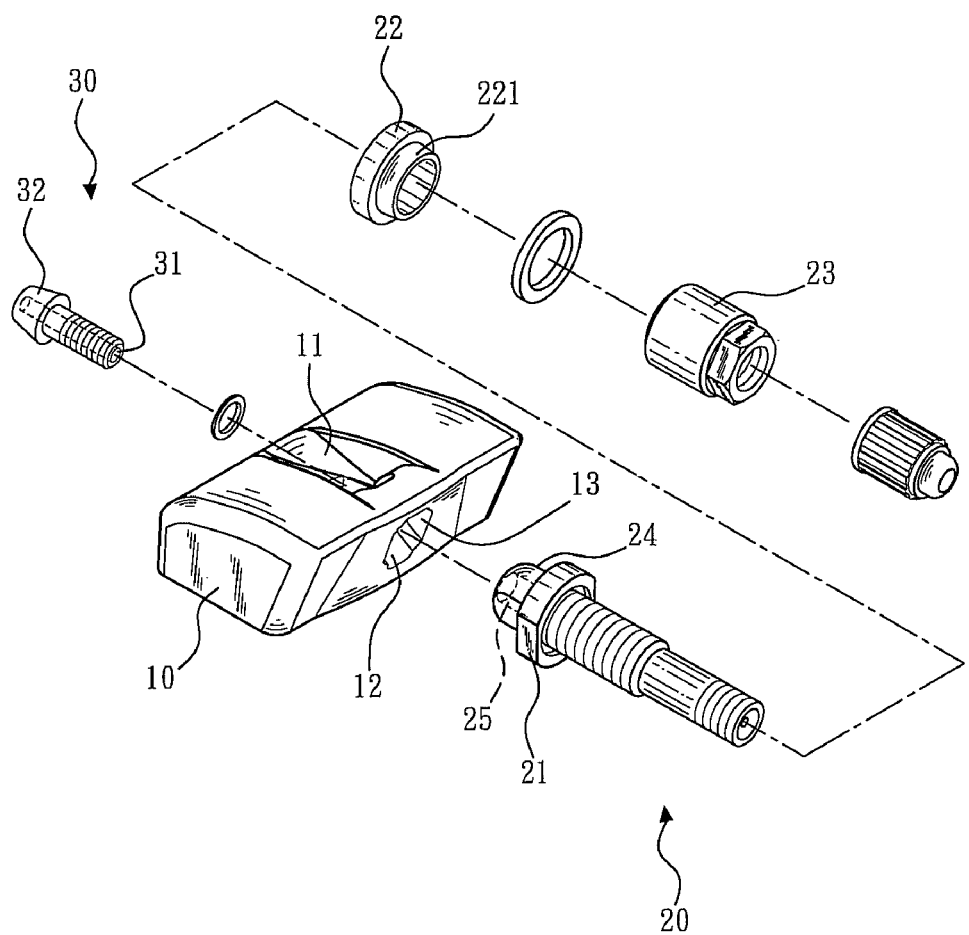
FIG. 3 is an exploded view of the disclosed tire pressure monitoring device.
Figure 4:
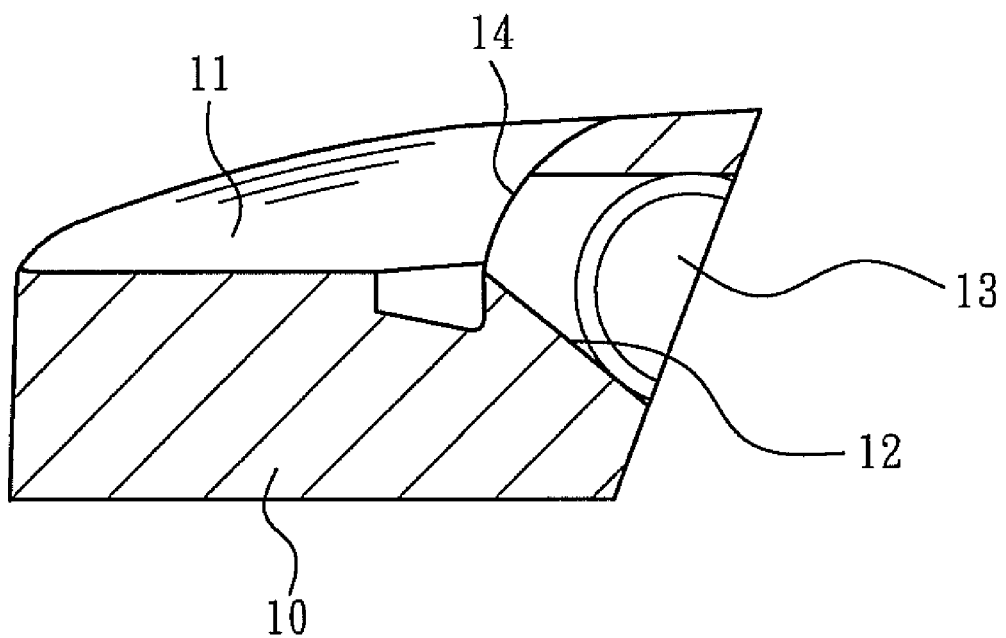
FIG. 4 is a cross-sectional view of a main body of the disclosed tire pressure monitoring device.

Referring to FIG. 2 through FIG. 4, the present invention is a tire pressure monitoring device with an inclinable valve stem 20. It primarily has a main body 10, the valve stem 20 and a positioning bolt 30.

The main body 10 has a channel 11 axially passing therethrough. The channel 11 includes a socket segment 12 near one end thereof. The socket segment 12 is transversely defined by a pair of retaining planes 13 parallel to each other. The main body 10 also has a cambered surface 14 at an end of the channel 11 opposite to the socket segment 12.

A retaining ring 21 is mounted around and raised from the valve stem 20. In addition, a washer 22 is sleeved around the valve stem 20 and a nut 23 is screwed around the valve stem 20. The washer 22 further includes a collar portion 221. The valve stem 20 has a domed end 24 that is configured to be movably received in the socket segment 12, and the domed end 24 is formed with a threaded hole 25 axially passing therethrough.

The positioning bolt 30 is positioned in the channel 11 from an end of the channel 11 opposite to the socket segment 12 and coupled with the threaded hole 25. The positioning bolt 30 us axially formed with a through hole 31, so that the through hole 31 is communicated with the interior of the valve stem 20. Therein, the positioning bolt 30 has a cap 32 that is configured to be retained by the cambered surface 14.

With the understanding of the configuration of the disclosed tire pressure monitoring device, one can be further informed of the operation of the tire pressure monitoring device through the following description.

Figure 5:
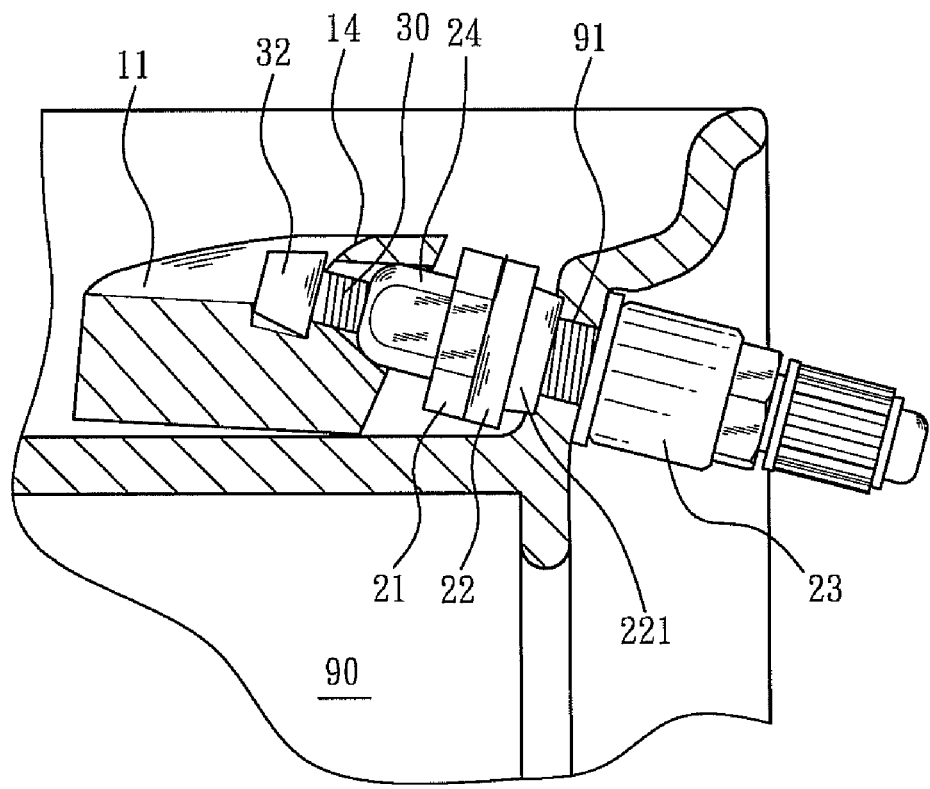
FIGS. 5 and 6 illustrate installation and adjustment of the tire pressure monitoring device according to the present invention.

As shown in FIG. 5, for installing the tire pressure monitoring device of the present invention, the valve stem 20 is put into a valve-stem hole 91 of a wheel rim 90 from the interior of the wheel rim 90, so as to leave the main body 10 at the interior of the wheel rim 90. While the retaining ring 21 and the washer 22 are placed at the interior of the wheel rim 90, the nut 23 at the exterior of the wheel rim 90 is coupled with the valve stem 20, so that the retaining ring 21 and the nut 23 jointly make the washer 22 abut against the valve-stem hole 91 in an airtight manner, there by preventing gas leakage from an inflated tire around the wheel rim 90, and fixing the main body 10 as well as the valve stem 20 firmly to the wheel rim 90. Particularly, the collar portion 221 of the washer 22 is capable of maintaining the airtight combination with the valve-stem hole 91 despite of the design of the wheel rim 90.

Figure 6:
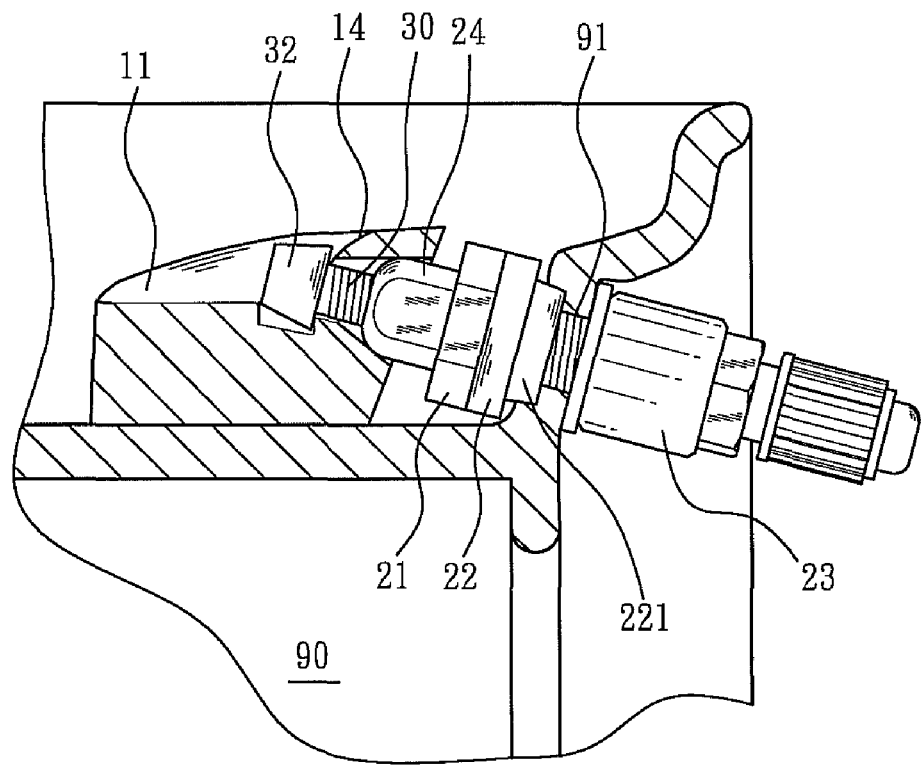

Furthermore, for preventing the main body 10 from suspending about the wheel rim 90 when the valve stem 20 is installed on the wheel rim 90 as shown in FIG. 5, the present invention taking the advantage of the movable combination between the domed end 24 of the valve stem 20 and the socket segment 12, allows adjustment of an angle between the connected valve stem 20 and main body 10, so as to ensure the main body 10 abutting against the wheel rim 90, as shown in FIG. 6, and in turn prevent the main body 10 from being rocked under the centrifugal force caused by the rolling wheel rim 90, thereby securing the entire device from being impacted and damaged. Such movable combination also adapts the device to various wheel rims.

In particular, the retaining; planes 13 being parallel to each other along a direction parallel to a radial direction of the wheel rim 90 are useful to limit the adjustment between the main body 10 and the valve stem 20 to the radial direction of the wheel rim 90, without allowing the device to rotate about the axis of the valve stem 20, so that the main body 10 is secured from deflection or misplacement. The cap 32 of the positioning bolt 30 works for not only attaching the valve stem 20 to the main body 10, but also moving against the cambered surface 14 to allow smooth adjustment between the main body 10 and the valve stem 20 when the valve stem 20 is operated to incline.

Figure 7:
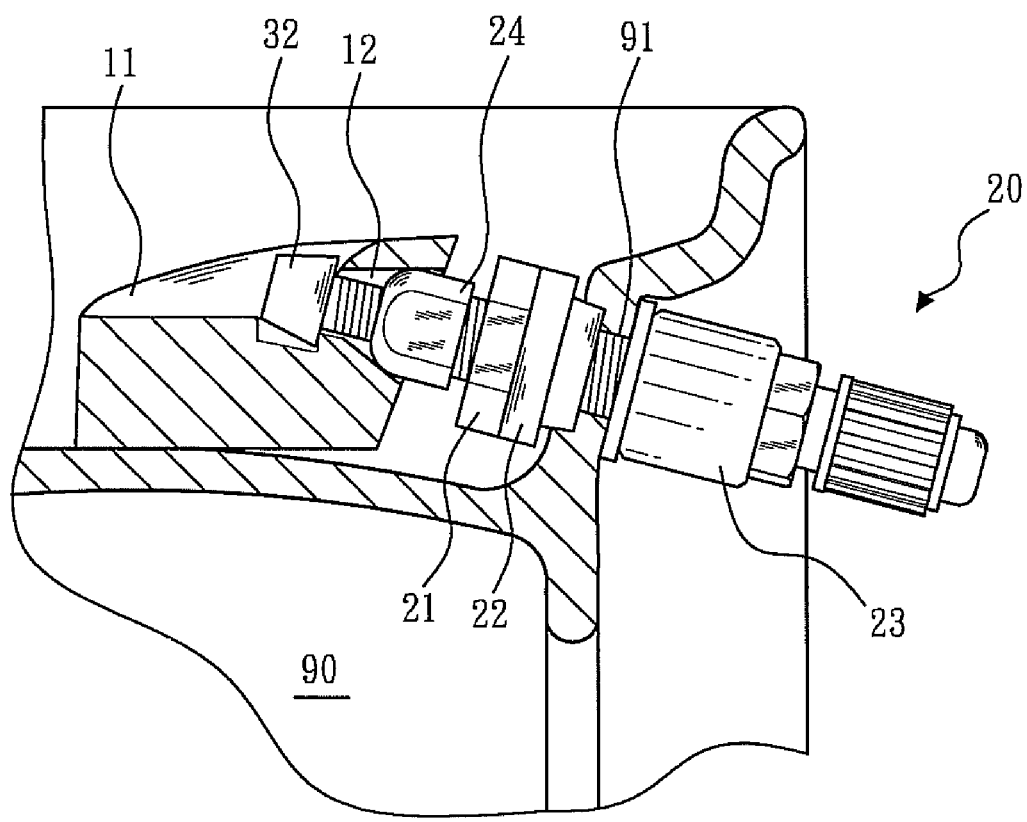
FIG. 7 shows a retaining ring in another embodiment of the present invention.

Moreover, referring to FIG. 7, the retaining ring 21 may be movably mounted around the valve stem 20 instead of integratedly formed with the latter. In such a case, the present invention further allows adjustment of a length of the valve stem 20 jutting out of the valve-stem hole 91, thereby making an interval between the main body 10 and the wheel rim 90 adjustable, and in turn facilitating proper placement of the main body 10.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A tire pressure monitoring device with an inclinable valve stem, the tire pressure monitoring device comprising:
   a main body having a channel axially passing therethrough, wherein the channel includes a socket segment near one end thereof;
   the valve stem being configured to be set in a valve-stem hole formed on a wheel rim, wherein a washer is sleeved around the valve stem and a nut is screwed around the valve stem, so as to fix the valve stem in the valve-stem hole, the valve stem having a domed end movably received in the socket segment, and the domed end being formed with a threaded hole axially passing therethrough; and
   a positioning bolt being positioned in the channel from an end of the channel opposite to the socket segment and coupled with the threaded hole, so that the domed end of the valve stem is movably positioned in the socket segment and when the domed end moves, an angle between the connected valve stem and the main body is changed, thereby allowing the main body to abut against the wheel rim.

2. The tire pressure monitoring device of claim 1, wherein the socket segment includes a pair of retaining planes parallel to each other.

3. The tire pressure monitoring device of claim 2, wherein the retaining planes are parallel to a radial direction of the wheel rim.

4. The tire pressure monitoring device of claim 1, wherein a retaining ring is mounted around the valve stem for retaining and positioning the washer.

5. The tire pressure monitoring device of claim 4, wherein the retaining ring is integratedly formed with the valve stem.

6. The tire pressure monitoring device of claim 4, wherein the retaining ring is moveably screwed to the valve stem.

7. The tire pressure monitoring device of claim 1, wherein the positioning bolt has an axially through hole.

8. The tire pressure monitoring device of claim 1, wherein the main body has a cambered surface at an end of the channel opposite to the socket segment, and the positioning bolt has a cap configured to be retained by the cambered surface.

9. The tire pressure monitoring device of claim 1, wherein the washer has a collar portion.

* * * * *